(12) United States Patent
Wei et al.

(10) Patent No.: US 8,617,496 B2
(45) Date of Patent: Dec. 31, 2013

(54) THREE WAY CONVERSION CATALYST WITH ALUMINA-FREE RHODIUM LAYER

(75) Inventors: Junmei Wei, Berkeley Heights, NJ (US); Attilio Siani, Hannover (DE); Mirko Arnold, Hannover (DE); Stefan Kotrel, Bedminster, NJ (US); Stephan Siemund, Pattensen (DE); Knut Wassermann, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 96 days.

(21) Appl. No.: 13/350,157

(22) Filed: Jan. 13, 2012

(65) Prior Publication Data
US 2012/0180464 A1 Jul. 19, 2012

Related U.S. Application Data

(60) Provisional application No. 61/434,206, filed on Jan. 19, 2011.

(51) Int. Cl.
| | | |
|---|---|---|
| *B01D 53/94* | (2006.01) | |
| *B01J 23/44* | (2006.01) | |
| *B01J 23/46* | (2006.01) | |
| *B01J 37/00* | (2006.01) | |
| *F01N 3/28* | (2006.01) | |

(52) U.S. Cl.
USPC ......... 423/213.2; 423/213.5; 60/274; 60/299; 502/304; 502/325; 502/339; 502/349; 502/514; 502/439; 502/527.12

(58) Field of Classification Search
USPC .............. 423/213.2, 213.5; 60/274, 299; 502/304, 325, 339, 349, 514, 439, 502/527.12
See application file for complete search history.

(56) References Cited

U.S. PATENT DOCUMENTS

| | | | |
|---|---|---|---|
| 4,171,288 A | 10/1979 | Keith et al. | |
| 6,692,712 B1 | 2/2004 | Anderson | |
| 6,808,687 B1 * | 10/2004 | Uenishi et al. | 422/177 |
| 2009/0175773 A1 * | 7/2009 | Chen et al. | 423/213.5 |
| 2009/0257933 A1 * | 10/2009 | Chen et al. | 423/213.2 |
| 2010/0104491 A1 * | 4/2010 | Deeba et al. | 423/239.1 |
| 2011/0107752 A1 * | 5/2011 | Galligan et al. | 60/299 |
| 2011/0237429 A1 * | 9/2011 | Akamine et al. | 502/303 |
| 2012/0283091 A1 * | 11/2012 | Sunada et al. | 502/304 |

FOREIGN PATENT DOCUMENTS

| | | |
|---|---|---|
| JP | 2010-119994 | 6/2010 |
| WO | WO 92/05861 | 4/1992 |
| WO | WO 2010/010747 | 1/2010 |

* cited by examiner

*Primary Examiner* — Timothy Vanoy
(74) *Attorney, Agent, or Firm* — Melanie L. Brown

(57) ABSTRACT

Provided are exhaust systems and components suitable for use in conjunction with gasoline engines to treat gaseous emissions such as hydrocarbons, nitrogen oxides, and carbon monoxides. Layered three-way conversion (TWC) catalysts comprise an outer layer whose rhodium is supported by an oxygen storage component, such as a ceria-zirconia composite, and the outer layer is substantially free from alumina as a support. The rhodium-containing layer can be free of all other precious metals, such as platinum and palladium. A lower palladium layer is provided where the palladium is supported by a refractory metal oxide. The lower palladium layer can be free of rhodium and platinum and can contain an oxygen storage component that is the same or different from that in the rhodium-containing layer. Methods of making and using these catalysts are also provided.

23 Claims, 1 Drawing Sheet

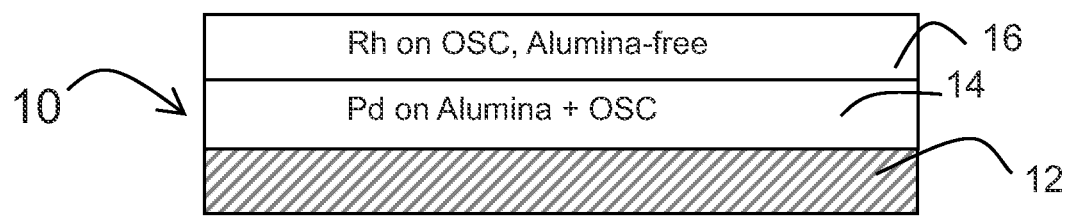

THREE WAY CONVERSION CATALYST WITH ALUMINA-FREE RHODIUM LAYER

CROSS-REFERENCE TO RELATED APPLICATIONS

This application claims priority under 35 U.S.C. §119(e) to U.S. Patent Application Ser. No. 61/434,206, filed Jan. 19, 2011, which is incorporated herein by reference in its entirety.

TECHNICAL FIELD

This invention pertains generally to emission treatment systems having catalysts used to treat gaseous streams of gasoline engines containing hydrocarbons, carbon monoxide, and oxides of nitrogen in conjunction with particulates. More specifically, this invention is directed to three-way conversion (TWC) catalysts where one or more layers are substantially free from alumina oxide. In particular, the alumina-free layers comprise rhodium.

BACKGROUND

Emission standards for unburned hydrocarbons, carbon monoxide and nitrogen oxide contaminants continue to become more stringent. In order to meet such standards, catalytic converters containing a three-way conversion (TWC) catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Layered catalysts can offer conversion functionality upon careful design of the materials of each layer. Ensuring that the materials are physically available (for example, not sintered or agglomerated) and active to convert exhaust gas throughout the life of the catalyst is an on-going goal.

There is a continuing need to provide a TWC catalyst that provides sufficient conversion so that stringent HC, NOx, and CO emission limits can be achieved cost-effectively.

SUMMARY

Provided are exhaust systems and components suitable for use in conjunction with gasoline engines to treat gaseous emissions such as hydrocarbons, nitrogen oxides, and carbon monoxides. In a first aspect, provided is a layered three-way conversion (TWC) catalyst where at least one layer is substantially free from alumina. Reference to alumina means aluminum oxide ($Al_2O_3$) of any crystalline form. "Substantially free from alumina" means that a layer contains no more than 4% by weight of aluminum oxide. Free from alumina, or alumina-free, means that there is 0% aluminum oxide in the layer.

In a particular embodiment, the substantially alumina-free layer contains rhodium. A specific embodiment provides that the substantially alumina-free layer comprises an oxygen storage component (OSC) content in the range of 0.10 g/in$^3$ to 1.0 g/in$^3$ (or 0.25 g/in$^3$ to 0.8 g/in$^3$ or even 0.25 g/in$^3$ to 0.5 g/in$^3$).

In a detailed embodiment, provided are layered catalyst composites comprising: a catalytic material on a carrier, the catalytic material comprising first and second layers, the first layer comprising a first precious metal component selected from palladium on a refractory metal oxide support and on a first oxygen storage component, the second layer being the outermost layer of the composite, comprising a second precious metal selected from rhodium on a second oxygen storage component, and being substantially alumina-free; wherein the catalytic material is effective to substantially simultaneously oxidize carbon monoxide and hydrocarbons and reduce nitrogen oxides. The second layer can be alumina-free. The second layer can be free from palladium and platinum. The second layer can present in a loading in the range of 0.1 to 2.0 g/in$^3$ (or 0.1 to 1.0 g/in$^3$, 0.25 g/in$^3$ to 0.8 g/in$^3$ or even 0.25 g/in$^3$ to 0.5 g/in$^3$). The first layer can be free from rhodium and platinum.

In detailed embodiments, the first oxygen storage component, the second oxygen storage component, or both independently comprise a ceria-zirconia composite. The ceria-zirconia composite can comprise ceria in the range of 10 to 99.9% by weight (or 5-15%, or 15-25%, or 25-35%, or 35-45%, or even 85-100%). The ceria-zirconia composite can comprise zirconia in the range of 0.1 to 90% by weight (or 43-53%, or 53-63%, or even 70-85%). The first oxygen storage component and the second oxygen storage component can both comprise the same ceria-zirconia composite that comprises, for example, ceria in the range of 35 to 45% by weight and zirconia in the range of 43 to 53% by weight. On the other hand, the first oxygen storage component and the second oxygen storage component can comprise different ceria-zirconia composites, the first oxygen storage component comprising ceria in the range of 35 to 45% by weight and zirconia in the range of 43 to 53% by weight and the second oxygen storage component comprising ceria in the range of 15 to 25% by weight and zirconia in the range of 70 to 80% by weight.

In other embodiments, the ceria-zirconia composite comprises ceria in the range of 25 to 35% by weight. In other embodiments, the ceria-zirconia composite comprises zirconia in the range of 53 to 63% by weight. In a detailed embodiment, the first oxygen storage component and the second oxygen storage component both comprise the same ceria-zirconia composite that comprises ceria in the range of 25 to 35% by weight and zirconia in the range of 53 to 63% by weight.

A detailed embodiment provides that the first layer further comprises a zirconia composite that is free of both ceria and praseodymia.

The refractory metal oxide support of the palladium-containing layer can comprise a compound that is activated, stabilized, or both selected from the group consisting of alumina, silica, silica-alumina, alumino-silicates, alumina-zirconia, lanthana-alumina, lanthana-zirconia-alumina, baria-alumina, baria-lanthana-alumina, baria-lanthana-neodymia-alumina, alumina-chromia, and alumina-ceria.

Embodiments can further comprise an undercoat that is on the carrier and below the first layer.

Other aspects include exhaust gas treatment systems comprising the catalyst composites provided located downstream of a gasoline engine.

Methods are also provided for treating a gas comprising hydrocarbons, carbon monoxide, and nitrogen oxides comprising: contacting the gas with the catalyst composites of the present invention.

A detailed embodiment provides that the second layer is alumina-free and free from palladium and platinum, and the first layer is free from rhodium and platinum.

Methods of making these layered catalyst composites are also provided.

BRIEF DESCRIPTIONS OF DRAWINGS

FIG. 1 is a schematic view showing a configuration of layers on a catalytic member of an exhaust gas treatment system.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Many applications of TWC catalysts utilize relatively low amounts of rhodium (Rh) and larger amounts of palladium (Pd) to achieve increasingly stringent regulatory requirements while keeping costs down. It is desirable to ensure that both the rhodium and the palladium are physically available for conversion chemistries over the life of the catalytic converter. In order to minimize agglomeration and sintering of rhodium it has been found that removal of all (and in some cases almost all) alumina from the rhodium layer and the use of an oxygen storage component (OSC) to support all of the rhodium can achieve desired conversions and, in fact, improved conversions as compared to catalysts whose rhodium layers contain both alumina as a support for the Rh and OSC. Without intending to be bound by theory, it is thought that Rh in the presence of alumina could react with such ingredient under high-temperature conditions occurring during the engine operations leading to the formation of Rh inactive species, thus negatively affecting the HC, CO, NOx purification rates. In a substantially alumina-free Rh coat, the probability of reaction between Rh and the alumina is substantially reduced, thus preserving more active Rh species on the support surface.

Moreover, rhodium layers can be loaded in lower amounts than typical (that is, about 2.0 g/in$^3$), for example in the range of 0.10 g/in$^3$ to 1.0 g/in$^3$ (or 0.25 g/in$^3$ to 0.8 g/in$^3$ or even 0.25 g/in$^3$ to 0.5 g/in$^3$) without losing activity. Again, without intending to be bound by theory, it is thought that a catalytic converter having overall a lower thermal mass can be heat-up faster than another catalytic converter having higher thermal mass, thus reaching faster temperatures at which the HC, CO and NOx conversion occur at higher purification efficiencies. In addition, at constant Rh-loading, the precious metal concentration on the support surface with lower washcoat mass would be higher, which improves the HC, CO, NOx purification efficiencies, without negatively affecting the precious metal component sintering.

TWC catalysts that exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. The refractory metal oxide supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 (Keith). TWC catalysts can also be formulated to include an oxygen storage component.

Reference to oxygen storage component (OSC) refers to an entity that has multi-valence state and can actively react with oxidants such as oxygen or nitrous oxides under oxidative conditions, or reacts with reductants such as carbon monoxide (CO) or hydrogen under reduction conditions. Examples of suitable oxygen storage components include ceria. Praseodymia can also be included as an OSC. Delivery of an OSC to the washcoat layer can be achieved by the use of, for example, mixed oxides. For example, ceria can be delivered by a mixed oxide of cerium and zirconium, and/or a mixed oxide of cerium, zirconium, and neodymium, and/or a mixed oxide of cerium, zirconium, lanthanum, and/or a mixed oxide of cerium, zirconium, lanthanum, and neodymium, and/or a mixed oxide of cerium, zirconium, lanthanum, neodymium, and yttrium. For example, praseodymia can be delivered by a mixed oxide of praseodymium and zirconium, and/or a mixed oxide of praseodymium, cerium, lanthanum, yttrium, zirconium, and neodymium.

Reference to a "support" in a catalyst washcoat layer refers to a material that receives precious metals, stabilizers, promoters, binders, and the like through association, dispersion, impregnation, or other suitable methods. Examples of supports include, but are not limited to, high surface area refractory metal oxides and composites containing oxygen storage components. High surface refractory metal oxide supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("m$^2$/g"), often up to about 200 m$^2$/g or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption.

Reference to a "ceria-zirconia composite" means a composite comprising ceria and zirconia, without specifying the amount of either component. Suitable ceria-zirconia composites include, but are not limited to, composites having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i.e., >99% purity). In one or more embodiments, the support material is alumina-free to maximize the presence of OSCs and precious metal components in a layer and/or composite.

Reference to "impregnated" means that a precious metal-containing solution is put into pores of a support. In detailed embodiments, impregnation of precious metals is achieved by incipient wetness, where a volume of diluted precious metal-containing is approximately equal to the pore volume of the support bodies. Incipient wetness impregnation generally leads to a substantially uniform distribution of the solution of the precursor throughout the pore system of the support. Reference to "intimate contact" includes having an effective amount of components in such contact (for example, Pd and OSC) on the same support, in direct contact, and/or in substantial proximity such that the OSC contacts oxygen components before the Pd component.

Reference to "substantially free" means that the material recited is not intentionally provided in the recited layer. It is recognized, however, that the material may migrate or diffuse to the recited layer in minor amounts considered to be insubstantial (that is <4% by weight of the material, 3%, 2%, or even 1%). As used herein, therefore, a "layer substantially free from alumina" is a layer containing no more than 4% by weight of aluminum oxide Preparation of Catalyst Composite Washcoats The catalyst composites may be formed in a single layer or multiple layers. The composites can readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated. A "washcoat layer," therefore, is defined as a coating that is comprised of support particles. A "catalyzed washcoat layer" is a coating comprised of support particles impregnated with catalytic components.

The catalyst composite can be readily prepared in layers on a carrier. For a first layer of a specific washcoat, finely divided particles of a high surface area refractory metal oxide such as gamma alumina are slurried in an appropriate vehicle, e.g., water. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Typically, when palladium is desired, the palladium component is utilized in the form of a compound or complex to achieve dispersion of the component on the refractory metal oxide support, e.g., activated alumina. The term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate.

A suitable method of preparing any layer of the layered catalyst composite of the invention is to prepare a mixture of a solution of a desired precious metal compound (e.g., palladium compound) and at least one support, such as a finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 20-60 wt. %, more particularly about 30-40 wt. %.

Additional layers, i.e., the second and third layers may be prepared and deposited upon the first layer in the same manner as described above for deposition of the first layer upon the carrier.

Embodiments

One aspect is directed to a layered catalyst composite or a catalytic article that has a layer comprising rhodium in the absence or substantial absence of alumina. Various embodiments are listed below. It will be understood that the embodiments listed below may be combined as listed below, but in other suitable combinations in accordance with the scope of the invention.

In embodiment one, provided is: a catalytic material on a carrier, the catalytic material comprising first and second layers, the first layer comprising a first precious metal component selected from palladium on a refractory metal oxide support and on a first oxygen storage component, the second layer being the outermost layer of the composite, comprising a second precious metal selected from rhodium on a second oxygen storage component, and being substantially alumina-free; wherein the catalytic material is effective to substantially simultaneously oxidize carbon monoxide and hydrocarbons and reduce nitrogen oxides.

In embodiment two, the second layer is alumina-free.

In embodiment three, the second layer is free from palladium and platinum.

In embodiment four, the first layer is free from rhodium and platinum.

In embodiment five, the second layer is present in a loading in the range of 0.1 to 2.0 $g/in^3$.

In embodiment six, the second layer is present in a loading in the range of 0.25 to 0.8 g/in3.

In embodiment seven, the first oxygen storage component, the second oxygen storage component, or both independently comprise a ceria-zirconia composite.

In embodiment eight, the ceria-zirconia composite comprises ceria in the range of 35 to 45% by weight.

In embodiment nine, the ceria-zirconia composite comprises zirconia in the range of 43 to 53% by weight.

In embodiment ten, the first oxygen storage component and the second oxygen storage component both comprise the same ceria-zirconia composite that comprises ceria in the range of 35 to 45% by weight and zirconia in the range of 43 to 53% by weight.

In embodiment eleven, the first oxygen storage component and the second oxygen storage component comprise different ceria-zirconia composites, the first oxygen storage component comprising ceria in the range of 35 to 45% by weight and zirconia in the range of 43 to 53% by weight and the second oxygen storage component comprising ceria in the range of 15 to 25% by weight and zirconia in the range of 70 to 80% by weight.

In embodiment twelve, the ceria-zirconia composite comprises ceria in the range of 25 to 35% by weight.

In embodiment thirteen, the ceria-zirconia composite comprises zirconia in the range of 53 to 63% by weight.

In embodiment fourteen, the first oxygen storage component and the second oxygen storage component both comprise the same ceria-zirconia composite that comprises ceria in the range of 25 to 35% by weight and zirconia in the range of 53 to 63% by weight.

In embodiment fifteen, the first layer further comprises a zirconia composite that is free of both ceria and praseodymia.

In embodiment sixteen, the refractory metal oxide support comprises a compound that is activated, stabilized, or both selected from the group consisting of alumina, silica, silica-alumina, alumino-silicates, alumina-zirconia, lanthana-alumina, lanthana-zirconia-alumina, baria-alumina, baria-lanthana-alumina, baria-lanthana-neodymia-alumina, alumina-chromia, and alumina-ceria.

In embodiment seventeen, further provided is an undercoat that is on the carrier and below the first layer.

In embodiment eighteen, provided is an exhaust gas treatment system comprising the catalyst composite of any of the embodiments recited, located downstream of a gasoline engine.

In embodiment nineteen, provided is a method for treating a gas comprising hydrocarbons, carbon monoxide, and nitrogen oxides comprising: contacting the gas with the catalyst composite of any of the embodiments recited.

In embodiment twenty, the second layer is alumina-free and free from palladium and platinum and the first layer is free from rhodium and platinum.

In embodiment twenty-one, the second layer is present in a loading in the range of 0.25 to 0.8 g/in$^3$.

In embodiment twenty-two, provided is a method of making a layered catalyst composite, the method comprising providing a carrier and coating the carrier with first and second layers of catalytic material; the first layer comprising a first precious metal component selected from palladium on a refractory metal oxide support and on a first oxygen storage component, the second layer being the outermost layer of the composite, comprising a second precious metal selected from rhodium on a second oxygen storage component, and being substantially alumina-free; wherein the catalytic material is effective to substantially simultaneously oxidize carbon monoxide and hydrocarbons and reduce nitrogen oxides.

In embodiment twenty-four, the second layer is present in a loading in the range of 0.25 to 0.8 g/in$^3$, alumina-free, and free from palladium and platinum and the first layer is free from rhodium and platinum.

EXAMPLES

The following non-limiting examples shall serve to illustrate the various embodiments of the present invention.

Example 1

Comparative

For the first (bottom) layer a palladium nitrate solution was added to 0.432 g/in$^3$ of high-porous gamma-alumina resulting in 27 g/ft$^3$ Pd. The resulting impregnated powder was dispersed in water and acid (e.g. acetic acid). Into this slurry 1.45 g/in$^3$ OSC material (CeO$_2$: 40.5%, ZrO$_2$: 49.6%) and promoters of Ba, Zr, and La were dispersed and milled to a particle size of 8 micrometer. The final slurry was coated onto a monolith, dried and 110° C. in air and calcined at 590° C. in air.

For the second (top coat) layer, a Rh nitrate solution was added to 1.25 g/in$^3$ of high-porous alumina resulting in 3 g/ft$^3$ Rh. The resulting impregnated powder was dispersed in water and acid (e.g. acetic acid). Into this slurry 0.25 g/in$^3$ of OSC material (CeO$_2$: 40.5%, ZrO$_2$: 49.6%) and promoters of Ba and Zr were dispersed and milled. The final slurry was coated onto a monolith previously coated with the first layer, dried and 110° C. in air and calcined at 590° C. in air.

Example 2

For the first layer, the procedures and compositions were identical to that of Example 1.

For the second (top coat) layer, a Rh nitrate solution was added to 0.25 g/in$^3$ of OSC material (CeO$_2$: 40.5%, ZrO$_2$: 49.6%) resulting in 3 g/ft$^3$ Rh. The resulting impregnated powder and promoters of Ba and Zr were dispersed in water and acid (e.g. acetic acid). The final slurry was milled and coated onto a monolith previously coated with the first layer, dried and 110° C. in air and calcined at 590° C. in air.

Example 3

Comparative

For the first (bottom) layer a Palladium nitrate solution was added to 0.432 g/in$^3$ of high-porous gamma-alumina resulting in 27 g/ft$^3$ Pd. The resulting impregnated powder was dispersed in water and acid (e.g. acetic acid). Into this slurry 1.45 g/in$^3$ OSC material (CeO$_2$ 40%, ZrO$_2$: 45%) and promoters of Ba, Zr, and La were dispersed and milled. The final slurry was coated onto a monolith, dried and 110° C. in air and calcined at 590° C. in air.

For the second (top coat) layer, a Rh nitrate solution was added to 1.25 g/in$^3$ of high-porous alumina resulting in 3 g/ft$^3$ Rh. The resulting impregnated powder was dispersed in water and acid (e.g. acetic acid). Into this slurry 0.25 g/in$^3$ of OSC material (CeO$_2$ 40%, ZrO$_2$: 45%) and promoters of Ba and Zr were dispersed and milled. The final slurry was coated onto a monolith previously coated with the first layer, dried and 110° C. in air and calcined at 590° C. in air.

Example 4

For the first layer, the procedures and compositions were identical to that of Example 3 except that the Pd quantity was 57 g/ft$^3$.

For the second (top coat) layer, a Rh nitrate solution was added to 0.25 g/in$^3$ of OSC material (CeO$_2$ 40%, ZrO$_2$: 45%) resulting in 3 g/ft$^3$ Rh. The resulting impregnated powder and promoters of Ba and Zr were dispersed in water and acid (e.g. acetic acid). The final slurry was milled and coated onto a monolith previously coated with the first layer, dried and 110° C. in air and calcined at 590° C. in air.

Example 5

For the first layer, the procedures and compositions were identical to that of Example 3 except that the Pd quantity was 57 g/ft$^3$.

For the second (top coat) layer, a Rh nitrate solution was added to 0.25 g/in$^3$ of OSC material (CeO$_2$ 10%, ZrO$_2$: 75%) resulting in 3 g/ft$^3$ Rh. The resulting impregnated powder and promoters of Ba and Zr were dispersed in water and acid (e.g. acetic acid). The final slurry was milled and coated onto a monolith previously coated with the first layer, dried and 110° C. in air and calcined at 590° C. in air.

Example 6

For the first layer, the procedures and compositions were identical to that of Example 3 except that the Pd quantity was 57 g/ft$^3$.

For the second (top coat) layer, a Rh nitrate solution was added to 0.8 g/in$^3$ of OSC material ($CeO_2$: 10%, $ZrO_2$: 75%) resulting in 3 g/ft$^3$ Rh. The resulting impregnated powder and promoters of Ba and Zr were dispersed in water and acid (e.g. acetic acid). The final slurry was milled and coated onto a monolith previously coated with the first layer, dried and 110° C. in air and calcined at 590° C. in air.

Example 7

For the first layer, the procedures and compositions were identical to that of Example 3 except that the Pd quantity was 57 g/ft$^3$.

For the second (top coat) layer, a Rh nitrate solution was added to 0.8 g/in$^3$ of OSC material ($CeO_2$: 40%, $ZrO_2$: 45%) resulting in 3 g/ft$^3$ Rh. The resulting impregnated powder and promoters of Ba and Zr were dispersed in water and acid (e.g. acetic acid). The final slurry was milled and coated onto a monolith previously coated with the first layer, dried and 110° C. in air and calcined at 590° C. in air.

Example 8

Comparative

For the first layer, the procedures and compositions were identical to that of Example 3 except that the Pd quantity was 57 g/ft$^3$.

For the second (top coat) layer, the procedures and composition were identical to that of Example 3.

Example 9

Samples A and B were aged for 80 hours at 1050° C. under exothermic conditions on engine. Under New European Drive Cycle (NEDC) conditions on a 2.0L engine Type 1 the performance of such samples was evaluated by measuring the HC, CO and NOx emissions which are reported in Table 1. Example 2, having an alumina-free top coat, performs better than Example 1 having the same amount and type of OSC as Example 2 with additional alumina.

TABLE 1

| Emissions | Example 1 Comparative | Example 2 Sample B |
|---|---|---|
| HC (g/km) | 0.169 | 0.160 |
| CO/10 (g/km) | 0.179 | 0.150 |
| NOx (g/km) | 0.333 | 0.247 |

Example 10

Samples 2 and 3 were aged for 80 hours at 1050° C. under exothermic conditions on engine. Under New European Drive Cycle (NEDC) conditions on a 2.0L engine Type 2 the performance of such samples was evaluated by measuring the HC, CO and NOx emissions which are reported in Table 2. Example 2 having an alumina-free top coat performs better than Example 3 having the same amount of OSC (with slightly different Ce—Zr contents) as Example 2 with additional alumina.

TABLE 2

| Emissions | Example 2 | Example 3 Comparative |
|---|---|---|
| HC (g/km) | 0.081 | 0.095 |
| CO/10 (g/km) | 0.096 | 0.123 |
| NOx (g/km) | 0.091 | 0.134 |

Example 11

Examples 4, 5, 6, and 7 were aged for 80 hours at 1050° C. under exothermic conditions on engine. Under New European Drive Cycle (NEDC) conditions on a 2.0L engine Type 1 the performance of such samples was evaluated by measuring the HC, CO and NOx emissions which are reported in Table 3. Examples 4 and 5 having lower amounts of OSC in the top coat, have lower HC, CO and NOx emissions than Examples 6 and 7, which have the same type of OSC as Examples 4 and 5, but in higher amount. It is surprising that a lower amount of OSC resulted in greater conversion. Without intending to be bound by theory, it is thought that a catalytic converter having overall a lower thermal mass can be heat-up faster than another catalytic converter having higher thermal mass, thus reaching faster temperatures at which the HC, CO and NOx conversion occur at higher purification efficiencies. Moreover, at constant Rh loading, the precious metal concentration on the support surface with lower washcoat mass would be higher, which improve the HC, CO, NOx purification efficiencies, without negatively affecting the precious metal sintering.

TABLE 3

| Emissions | Example 4 | Example 5 | Example 6 | Example 7 |
|---|---|---|---|---|
| HC (g/km) | 0.067 | 0.066 | 0.069 | 0.082 |
| CO/10 (g/km) | 0.098 | 0.104 | 0.101 | 0.123 |
| NOx (g/km) | 0.063 | 0.061 | 0.074 | 0.078 |

Example 12

Examples 7 and 8 were aged for 80 hours at 1050° C. under exothermic conditions on engine. Under New European Drive Cycle (NEDC) conditions on a 2.0L engine Type 1 the performance of such samples was evaluated by measuring the HC, CO and NOx emissions which are reported in Table 4. Example 7 having an alumina-free top coat performs better than Example 8 having the same type of and a lesser amount OSC as Example 7 and additional alumina. It is thought that Rh in the presence of alumina could react with such ingredient under high-temperature conditions occurring during the engine operations leading to the formation of Rh inactive species, thus negatively affecting the HC, CO, NOx purification rates. In the alumina-free Rh coat, the probability of reaction between Rh and the alumina is substantially reduced, thus preserving more active Rh species on the support surface.

TABLE 4

| Emissions | Example 7 | Example 8 Comparative |
|---|---|---|
| HC (g/km) | 0.072 | 0.083 |
| CO/10 (g/km) | 0.092 | 0.106 |
| NOx (g/km) | 0.095 | 0.097 |

Example 13

Examples 4 and 8 were aged for 60 hours at 900° C. under exothermic conditions on engine and with high phosphorous containing fuel. Under New European Drive Cycle (NEDC) conditions on a 2.0L engine Type 2 the performance of such samples was evaluated by measuring the HC, CO and NOx emissions which are reported in Table 5. As one can see, Example 4 having an alumina-free top coat has lower HC, CO and NOx emissions than Example 8, which has the same amount and type of OSC of Example 4 and additional alumina.

TABLE 5

| Emissions | Example 4 | Example 8 Comparative |
|---|---|---|
| HC (g/km) | 0.049 | 0.053 |
| CO/10 (g/km) | 0.058 | 0.069 |
| NOx (g/km) | 0.043 | 0.071 |

Example 14A

A composite having a catalytic material was prepared using two layers: an inner layer and an outer layer on a substrate. The layered catalyst composite contained palladium and rhodium with a total precious metal loading of 80 g/ft$^3$ and with a Pt/Pd/Rh ratio of 0/78/2. The layers were prepared as follows:

The components present in the inner layer were high surface area lanthana-stabilized gamma alumina, a ceria-zirconia oxide composite (CeO$_2$: 40%, ZrO$_2$: 50%), a zirconia oxide composite (ZrO$_2$: 75%), a binder, barium oxide, and palladium at concentrations of approximately 22.6%, 56.5%, 13.6%, 2.3%, 3.1%, and 2%, respectively, based on the calcined weight of the catalyst. The total loading of the inner layer was 2.213 g/in$^3$.

The alumina, ceria-zirconia composite, and zirconia composite were mixed with water, and pH was increased to above 7 using Ba(OH)$_2$. Then Pd was impregnated onto the support surface in the slurry using Pd nitrate. The impregnated material was then calcined. The slurry was then milled and coated onto a substrate, dried and calcined at 500° C. for two hours.

The components present in the outer layer were a ceria-zirconia oxide composite (CeO$_2$: 10.6%, ZrO$_2$: 74.1%), zirconium oxide, strontium oxide, barium oxide, a binder, and rhodium, at concentrations of approximately 89.1%, 3.7%, 1.9%, 1.5%, 3.7%, and 0.1%, respectively, based on the calcined weight of the catalyst. The total loading of the outer layer was 1.346 g/in$^3$.

The Rh was impregnated onto the ceria-zirconia composite. The impregnated powder was then added to water containing Ba(OH)$_2$ solution. The pH was then reduced to 4-5 using nitric acid/Zr-nitrate/SrOAc, and the slurry was milled. The Rh slurry was then coated as a second layer over the bottom Pd-layer. The coated catalyst composite was then dried and calcined at 550° C. for two hours.

Example 14B

A composite having a catalytic material was prepared using two layers: an inner layer and an outer layer on a substrate. The layered catalyst composite contained palladium and rhodium with a total precious metal loading of 80 g/ft$^3$ and with a Pt/Pd/Rh ratio of 0/78/2. The layers were prepared as follows:

The components present in the inner layer were high surface area lanthana-stabilized gamma alumina, a ceria-zirconia oxide composite (CeO$_2$: 40%, ZrO$_2$: 50%), a binder, barium oxide, and palladium at concentrations of approximately 25.6%, 63.9%, 2.6%, 7.7%, and 0.3%, respectively, based on the calcined weight of the catalyst. The total loading of the inner layer was 1.956 g/in$^3$.

The alumina and ceria-zirconia composite were mixed with water, and pH was increased to above 7 using Ba(OH)$_2$. Then Pd was impregnated onto the support surface in the slurry using Pd nitrate. The impregnated material was then calcined. The slurry was then milled and coated onto a substrate, dried and calcined at 500° C. for two hours.

The outer layer was prepared in the same manner and with the same components as the outer layer of Example 14A.

Example 14C

A composite having a catalytic material is prepared using two layers: an inner layer and an outer layer on a substrate. The layered catalyst composite contains palladium and rhodium with a total precious metal loading of 80 g/ft$^3$ and with a Pt/Pd/Rh ratio of 0/78/2. The layers are prepared as follows:

The inner layer is prepared in the same manner and with the same components as the outer layer of Example 14A and/or Example 14B.

The components present in the outer layer are a ceria-zirconia oxide composite (CeO$_2$: 10.6%, ZrO$_2$: 74.1%), zirconium oxide, strontium oxide, barium oxide, and rhodium, at concentrations of approximately 92.6%, 3.9%, 1.9%, 1.6%, and 0.1%, respectively, based on the calcined weight of the catalyst. The total loading of the outer layer is 1.296 g/in$^3$. The outer layer is prepared as provided for the outer layer of Example 14A and/or 14B.

Example 14D

A composite having a catalytic material is prepared using two layers: an inner layer and an outer layer on a substrate. The layered catalyst composite contains palladium and rhodium with a total precious metal loading of 80 g/ft$^3$ and with a Pt/Pd/Rh ratio of 0/78/2. The layers are prepared as follows:

The inner layer is prepared in the same manner and with the same components as the outer layer of Example 14A and/or Example 14B.

The components present in the outer layer are a ceria-zirconia oxide composite (CeO$_2$: 10.6%, ZrO$_2$: 74.1%), zirconium oxide, strontium oxide, barium oxide, and rhodium, at concentrations of approximately 86.2%, 7.2%, 3.6%, 2.9%, and 0.2%, respectively, based on the calcined weight of the catalyst. The total loading of the outer layer is 0.696 g/in$^3$. The outer layer is prepared as provided for the outer layer of Example 14A and/or 14B.

Examples 15-17

Comparatives

Comparative Pd—Rh composites were prepared using two layers: an inner layer and an outer layer on a substrate. The layered catalyst composite contained palladium and rhodium with a total precious metal loading of 80 g/ft$^3$ and with a Pt/Pd/Rh ratio of 0/78/2. The layers were prepared as follows:

The inner layers of the comparative examples were prepared in the same manner and with the same components as the inner layer of Example 14A.

The outer layers of the comparative examples contained alumina as the rhodium support. The components present in the outer layers were as follows:

| Component | Example 15 | Example 16 | Example 17 |
|---|---|---|---|
| Zr—La—Al$_2$O$_3$ (wt %) | 45.4 | 45.4 | 22.7 |
| ceria-zirconia oxide composite (CeO$_2$: 10.6%, ZrO$_2$: 74.1%) (wt %) | 45.4 | — | — |
| ceria-zirconia oxide composite (CeO$_2$: 40%, ZrO$_2$: 50%) (wt %) | — | 45.4 | 68.2 |
| ZrO$_2$ (wt %) | 3.8 | 3.8 | 3.8 |
| BaO (wt %) | 1.5 | 1.5 | 1.5 |
| Binder (wt %) | 3.8 | 3.8 | 3.8 |
| Rhodium (wt %) | 0.1 | 0.1 | 0.1 |
| Loading | 1.321 g/in$^3$ | 1.321 g/in$^3$ | 1.321 g/in$^3$ |

For each outer layer, the Rh was impregnated onto the alumina in a slurry. The impregnated powder was then added to water containing Ba(OH)$_2$ solution and the ceria-zirconia composite. The pH was then reduced to 4-5 using nitric acid/Zr-nitrate, and the slurry was milled. The Rh slurry was then coated as a second layer over the bottom Pd-layer. The coated catalyst composite was then dried and calcined at 550° C. for two hours.

Example 18

Testing

Examples 14A, 15, 16, and 17 were tested on Model Year 2011 3.5L gasoline engine after 100 hours of exothermic aging (with P).

| | FTP | | | US06 | | |
|---|---|---|---|---|---|---|
| | NMHC + NOx | NMHC | NOx | NMHC + NOx | NMHC | NOx |
| Example 15 Comparative | 35 | 14 | 21 | 63 | 12 | 51 |
| Example 16 Comparative | 36 | 13 | 23 | 88 | 13 | 75 |
| Example 17 Comparative | 68 | 15 | 53 | 76 | 12 | 64 |
| Example 14A | 33 | 13 | 20 | 45 | 9 | 36 |

Example 14A being substantially alumina-free showed better NOx and NMHC conversions as compared to the comparative Examples 15-17.

Example 19

A composite having a catalytic material was prepared using three layers: an under coat, an inner layer, and an outer layer on a substrate. The layered catalyst composite contained palladium and rhodium with a total precious metal loading of 30 g/ft$^3$ and with a Pt/Pd/Rh ratio of 0/9/1. The layers were prepared as follows:

The components present in the under coat were high surface area gamma alumina, an oxygen storage component (OSC) (CeO$_2$: 45%, ZrO$_2$: 50%), a zirconia oxide, and a binder, at concentrations of approximately 23.3%, 69.8%, 4.7%, and 2.3%, respectively, based on the calcined weight of the catalyst. The total loading of the under coat was 0.86 g/in$^3$. The components were mixed in an aqueous slurry and coated onto a substrate. The coated substrate was then dried and calcined at 550° C. for 2 hours.

The components present in the inner layer were high surface area lanthana-stabilized gamma alumina, an oxygen storage component (OSC) (CeO$_2$: 45%, ZrO$_2$: 50%), barium oxide, and palladium at concentrations of approximately 30.9%, 61.9%, 6.2%, and 1.0%, respectively, based on the calcined weight of the catalyst. The total loading of the inner layer was 1.616 g/in$^3$.

Pd in the form of palladium nitrate was impregnated onto the lanthana-stabilized alumina using barium hydroxide to adjust pH. The OSC was added to the slurry. The slurry was then milled and coated onto a substrate, dried and calcined at 550° C. for 2 hours.

The components present in the outer layer were a ceria-zirconia oxide composite (CeO2: 10.6%, ZrO2: 74.1%), zirconium oxide, barium oxide, and rhodium, at concentrations of approximately 94.3%, 2.8%, 2.8%, and 0.2%, respectively, based on the calcined weight of the catalyst. The total loading of the outer layer was 0.902 g/in3.

The Rh was impregnated onto the ceria-zirconia composite. The impregnated powder was then added to water containing Ba(OH)$_2$ solution. The pH was then reduced to 4-5 using nitric acid/Zr-nitrate, and the slurry was milled. The Rh slurry was then coated as a second layer over the Pd-layer. The coated catalyst composite was then dried and calcined at 550° C. for 2 hours.

Example 20

Comparative

A comparative Pd—Rh composite was prepared using three layers: an under coat, an inner layer, and an outer layer on a substrate. The layered catalyst composite contained palladium and rhodium with a total precious metal loading of 30 g/ft3 and with a Pt/Pd/Rh ratio of 0/9/1.

The under coat of the comparative example was prepared in the same manner and with the same components as the under coat of Example 19.

The inner layer of the comparative example was prepared in the same manner and with the same components as the inner layer of Example 19.

The outer layer of the comparative example contained alumina as the rhodium support. The components present in the outer layer were a zirconium-stabilized alumina, a ceria-zirconia oxide composite (CeO2: 10.6%, ZrO2: 74.1%), zirconium oxide, barium oxide, and rhodium, at concentrations of approximately 66.5%, 27.7%, 2.8%, 2.8%, and 0.2%, respectively, based on the calcined weight of the catalyst. The total loading of the outer layer was 0.902 g/in3.

The Rh was impregnated onto the zirconium-stabilized alumina. The impregnated powder was then added to water containing Ba(OH)$_2$ solution and the ceria-zirconia composite. The pH was then reduced to 4-5 using nitric acid/Zr-nitrate, and the slurry was milled. The Rh slurry was then coated as a second layer over the Pd-layer. The coated catalyst composite was then dried and calcined at 550° C. for 2 hours.

Example 21

Testing

Examples 19-20 were tested under MVEG cycle conditions using an 8.1L, V8 engine. Aging conditions were 50 hours at 1030° C. bed with premium unleaded fuel.

| Total Tailpipe Emissions | Example 19 | Example 20 Comparative |
|---|---|---|
| THC (g/km) | 0.104 | 0.131 |
| CO/10 (g/km) | 0.095 | 0.116 |
| NOx (g/km) | 0.110 | 0.182 |

The Ce—Zr supported rhodium sample that was alumina-free of Example 19 showed lower emissions than the stabilized alumina supported rhodium sample of comparative Example 20.

Example 22

Comparative

A composite having a catalytic material was prepared using three layers: an under coat, an inner layer, and an outer layer on a substrate. The layered catalyst composite contained palladium and rhodium with a total precious metal loading of 30 g/ft3 and with a Pt/Pd/Rh ratio of 0/9/1. The layers were prepared as follows:

The components present in the under coat were high surface area gamma alumina, a ceria-zirconia oxide composite (CeO2: 40%, ZrO2: 50%), a lanthana oxide, a zirconia oxide, a binder, and palladium at concentrations of approximately 16.9%, 76.0%, 0.7%, 3.4%, 3.0%, and 0.1%, respectively, based on the calcined weight of the catalyst. The total loading of the under coat was 1.184 g/in3. The palladium was impregnated onto the alumina and the remaining components were mixed into the slurry, which was coated onto a substrate. The coated substrate was then dried and calcined at 550° C. for 2 hours.

The components present in the inner layer were high surface area gamma alumina, a ceria-zirconia oxide composite (CeO2: 40%, ZrO2: 50%), barium oxide, zirconium oxide, and palladium at concentrations of approximately 36.1%, 54.2%, 7.2%, 1.4%, and 1.1%, respectively, based on the calcined weight of the catalyst. The total loading of the inner layer was 1.385 g/in3.

Pd in the form of palladium nitrate was impregnated onto the alumina using barium hydroxide to adjust pH. The ceria-zirconia composite was added to the slurry. The slurry was then milled and coated onto a substrate, dried and calcined at 550° C. for 2 hours.

The components present in the outer layer were lanthana-stabilized gamma alumina, a ceria-zirconia oxide composite (CeO2: 10.6%, ZrO2: 74.1%), zirconium oxide, barium oxide, and rhodium, at concentrations of approximately 64.4%, 26.8%, 2.7%, 2.7%, and 0.2%, respectively, based on the calcined weight of the catalyst. The total loading of the outer layer was 0.922 g/in3.

The Rh was impregnated onto the lanthana-stabilized gamma alumina. The impregnated powder was then added to water containing $Ba(OH)_2$ solution and the ceria-zirconia composite. The pH was then reduced to 4-5 using nitric acid/Zr-nitrate, and the slurry was milled. The Rh slurry was then coated as a second layer over the Pd-layer. The coated catalyst composite was then dried and calcined at 550° C. for 2 hours.

Examples 23-27

Pd—Rh composites were prepared using three layers: an under coat, an inner layer, and an outer layer on a substrate. The layered catalyst composite contained palladium and rhodium with a total precious metal loading of 30 g/ft3 and with a Pt/Pd/Rh ratio of 0/9/1. The layers were prepared as follows:

The under coats were prepared in the same manner and with the same components as the under coat of Example 22.

The inner layers were prepared in the same manner and with the same components as the inner layer of Example 22.

The outer layers contained only a ceria component or composite as the rhodium support, no alumina as a support. The compositions of the ceria-zirconia components were varied. The components present in the outer layers were as follows:

| Component | Example 23 | Example 24 | Example 25 | Example 26 | Example 27 |
|---|---|---|---|---|---|
| La—$Al_2O_3$ (wt %) | 0 | 0 | 0 | 0 | 0 |
| ceria-zirconia oxide composite ($CeO_2$: 10.6%, $ZrO_2$: 74.1%,) (wt %) | 91.2 | — | — | — | — |
| ceria-zirconia oxide composite ($CeO_2$: 45.6%, $ZrO_2$: 49.6%) (wt %) | — | 91.2 | — | — | — |
| ceria-zirconia oxide composite ($CeO_2$: 20%, $ZrO_2$: 64.9%) (wt %) | — | — | — | 91.2 | — |
| Ceria ($CeO_2$: 100%) | — | — | 91.2 | — | — |
| $ZrO_2$ (wt %) | 2.7 | 2.7 | 2.7 | 2.7 | 2.7 |
| BaO (wt %) | 2.7 | 2.7 | 2.7 | 2.7 | 2.7 |
| Binder (wt %) | 3.2 | 3.2 | 3.2 | 3.2 | 0 |
| Rhodium (wt %) | 0.2 | 0.2 | 0.2 | 0.2 | 0.2 |
| Loading | 0.932 g/in3 | 0.932 g/in3 | 0.932 g/in3 | 0.932 g/in3 | 0.902 g/in3 |

For each outer layer, the Rh was impregnated onto the ceria or ceria-zirconia composite in a slurry. The impregnated powder was then added to water containing $Ba(OH)_2$ solution. The pH was then reduced to 4-5 using nitric acid/Zr-nitrate, and the slurry was milled. The Rh slurry was then coated as a second layer over the Pd-layer. The coated catalyst composite was then dried and calcined at 550° C. for 2 hours.

Example 28

Testing

Examples 22-27 were tested on GVS (gasoline vehicle simulator) after 5 hours of air/steam aging at 1050° C. Percent residual results were as follows:

| Total %<br>Residual | Example<br>22 COMP. | Example<br>23 | Example<br>24 | Example<br>25 | Example<br>26 | Example<br>27 |
|---|---|---|---|---|---|---|
| HC | 22 | 14.6 | 15.4 | 13.8 | 14.4 | 11.7 |
| CO | 18.3 | 14.6 | 14.7 | 12.5 | 14.5 | 13.5 |
| NOx | 38.9 | 35.0 | 33.0 | 30.0 | 31.8 | 27.0 |

Based on this data, it is concluded that removal of alumina as a rhodium support improves emissions. Also, removal of binder material also improves emissions.

Examples 22 and 23 were aged for 12 hours of air/steam at 1050° C. Dispersion data shows that the dispersion of Rh supported on Al2O3 of Example 22 was 9.5% and the dispersion of Rh supported on OSC of Example 23 was 19.7%.

Example 29

Comparative

For the first (bottom) layer a Palladium nitrate solution was added to 0.432 g/in$^3$ of high-porous gamma-alumina resulting in 47 g/ft$^3$ Pd. The resulting impregnated powder was dispersed in water and acid (e.g. acetic acid). Into this slurry 1.45 g/in$^3$ OSC material (CeO2: 40%, ZrO2: 45%) was dispersed and milled. The final slurry was coated onto a monolith, dried and 110° C. in air and calcined at 590° C. in air.

For the second (top coat) layer, a Rh nitrate solution was added to 1.25 g/in$^3$ of high-porous alumina resulting in 3 g/ft$^3$ Rh. The resulting impregnated powder was dispersed in water and acid (e.g. acetic acid). Into this slurry 0.25 g/in$^3$ of OSC material (CeO$_2$: 40%, ZrO$_2$: 45%) was dispersed and milled to a particle size of 8 micrometer. The final slurry was coated onto a monolith previously coated with the 1$^{st}$ layer, dried and 110° C. in air and calcined at 590° C. in air.

Example 30

For the first layer, the procedures and were identical to that of Example 29, however the OSC composition was different: CeO$_2$ 29%, ZrO$_2$ 56%.

For the second layer (topcoat), a Rh nitrate solution was added to 0.8 g/in$^3$ of OSC material (CeO$_2$: 29%, ZrO$_2$: 56%) resulting in 3 g/ft$^3$ Rh. The resulting impregnated powder was dispersed in water and acid (e.g. acetic acid). The final slurry was milled and coated onto a monolith previously coated with the first layer, dried and 110° C. in air and calcined at 590° C. in air.

Example 31

Example 29 and Example 30 were aged for 100 hours at 1030° C. bed temperature under fuel-cut conditions on engine. Under New European Drive Cycle (NEDC) conditions on a 2.0L engine Type 1 the performance of such samples was evaluated by measuring the HC, CO and NOx emissions which are reported in the following table. Example 30 having an Alumina-free topcoat performed better than Example 29.

| Emissions | Example 29 | Example 30 |
|---|---|---|
| HC (g/km) | 0.111 | 0.117 |
| CO/10 (g/km) | 0.088 | 0.080 |
| NOx (g/km) | 0.081 | 0.055 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. A layered catalyst composite comprising: a catalytic material on a carrier, the catalytic material comprising first and second layers, the first layer comprising a first precious metal component selected from palladium on a refractory metal oxide support and on a first oxygen storage component, the second layer being the outermost layer of the composite, comprising a second precious metal selected from rhodium on a second oxygen storage component, and being substantially alumina-free; wherein the catalytic material is effective to substantially simultaneously oxidize carbon monoxide and hydrocarbons and reduce nitrogen oxides.

2. The composite of claim 1, wherein the second layer is alumina-free.

3. The composite of claim 1, wherein the second layer is free from palladium and platinum.

4. The composite of claim 1, wherein the first layer is free from rhodium and platinum.

5. The composite of claim 1, wherein the second layer is present in a loading in the range of 0.1 to 2.0 g/in$^3$.

6. The composite of claim 5, wherein the second layer is present in a loading in the range of 0.25 to 0.8 g/in$^3$.

7. The composite of claim 1, wherein the first oxygen storage component, the second oxygen storage component, or both independently comprise a ceria-zirconia composite.

8. The composite of claim 7, wherein the ceria-zirconia composite comprises ceria in the range of 35 to 45% by weight.

9. The composite of claim 7, wherein the ceria-zirconia composite comprises zirconia in the range of 43 to 53% by weight.

10. The composite of claim 7, wherein the first oxygen storage component and the second oxygen storage component both comprise the same ceria-zirconia composite that comprises ceria in the range of 35 to 45% by weight and zirconia in the range of 43 to 53% by weight.

11. The composite of claim 7, wherein the first oxygen storage component and the second oxygen storage component comprise different ceria-zirconia composites, the first oxygen storage component comprising ceria in the range of 35 to 45% by weight and zirconia in the range of 43 to 53% by weight and the second oxygen storage component comprising ceria in the range of 15 to 25% by weight and zirconia in the range of 70 to 80% by weight.

12. The composite of claim 7, wherein the ceria-zirconia composite comprises ceria in the range of 25 to 35% by weight.

13. The composite of claim 7, wherein the ceria-zirconia composite comprises zirconia in the range of 53 to 63% by weight.

14. The composite of claim 7, wherein the first oxygen storage component and the second oxygen storage component both comprise the same ceria-zirconia composite that comprises ceria in the range of 25 to 35% by weight and zirconia in the range of 53 to 63% by weight.

15. The composite of claim 1, wherein the first layer further comprises a zirconia composite that is free of both ceria and praseodymia.

16. The composite of claim 1, wherein the refractory metal oxide support comprises a compound that is activated, stabilized, or both selected from the group consisting of alumina, silica, silica-alumina, alumino-silicates, alumina-zirconia, lanthana-alumina, lanthana-zirconia-alumina, baria-alumina, baria-lanthana-alumina, baria-lanthana-neodymia-alumina, alumina-chromia, and alumina-ceria.

17. The composite of claim 1, further comprising an undercoat that is on the carrier and below the first layer.

18. An exhaust gas treatment system comprising the catalyst composite of claim 1 located downstream of a gasoline engine.

19. A method for treating a gas comprising hydrocarbons, carbon monoxide, and nitrogen oxides comprising: contacting the gas with the catalyst composite of claim 1.

20. The method of claim 19, wherein the second layer is alumina-free and free from palladium and platinum and the first layer is free from rhodium and platinum.

21. The composite of claim 16, wherein the second layer is present in a loading in the range of 0.25 to 0.8 $g/in^3$.

22. A method of making a layered catalyst composite, the method comprising providing a carrier and coating the carrier with first and second layers of catalytic material; the first layer comprising a first precious metal component selected from palladium on a refractory metal oxide support and on a first oxygen storage component, the second layer being the outermost layer of the composite, comprising a second precious metal selected from rhodium on a second oxygen storage component, and being substantially alumina-free; wherein the catalytic material is effective to substantially simultaneously oxidize carbon monoxide and hydrocarbons and reduce nitrogen oxides.

23. The method of claim 22, wherein the second layer is present in a loading in the range of 0.25 to 0.8 $g/in^3$, alumina-free, and free from palladium and platinum and the first layer is free from rhodium and platinum.

* * * * *